United States Patent
Werner et al.

(10) Patent No.: US 12,537,263 B2
(45) Date of Patent: Jan. 27, 2026

(54) THERMALLY ACTIVATED RETRACTABLE EMC PROTECTION

(71) Applicant: INTERNATIONAL BUSINESS MACHINES CORPORATION, Armonk, NY (US)

(72) Inventors: John S. Werner, Fishkill, NY (US); Andrew C. M. Hicks, Highland, NY (US); Noah Singer, White Plains, NY (US); Prabjit Singh, Poughkeepsie, NY (US); Sadegh Khalili, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 719 days.

(21) Appl. No.: 17/822,580

(22) Filed: Aug. 26, 2022

(65) Prior Publication Data
US 2024/0072373 A1   Feb. 29, 2024

(51) Int. Cl.
*H01M 50/00* (2021.01)
*H01M 50/383* (2021.01)
*H01M 50/618* (2021.01)
*H01M 50/636* (2021.01)

(52) U.S. Cl.
CPC ....... *H01M 50/383* (2021.01); *H01M 50/618* (2021.01); *H01M 50/636* (2021.01)

(58) Field of Classification Search
CPC . H01M 50/383; H01M 50/618; H01M 50/636
See application file for complete search history.

(56) References Cited

U.S. PATENT DOCUMENTS

| 3,806,370 | A | 4/1974 | Nischik |
| 4,294,891 | A | 10/1981 | Yao |
| 5,284,720 | A | 2/1994 | Thuerk |
| 5,716,726 | A | 2/1998 | Cheiky |
| 8,920,986 | B2 | 12/2014 | Cardenas-Valencia |

(Continued)

FOREIGN PATENT DOCUMENTS

| CN | 201717346 U | 1/2011 |
| CN | 105552472 A | 5/2016 |

(Continued)

OTHER PUBLICATIONS

Dannar et al., Cell Thermal Runaway Mitigation Systems and Methods, Feb. 2021, See the Abstract. (Year: 2021).*

(Continued)

*Primary Examiner* — Tiffany Legette
*Assistant Examiner* — Monique M Wills
(74) *Attorney, Agent, or Firm* — Tihon Poltavets

(57) ABSTRACT

A system and method for flushing the electrolyte out of an electrolyte flushable battery apparatus during a thermal runaway event. At least one condition of the electrolyte flushable battery apparatus is monitored to detect a potential thermal runaway event based on the at least one condition exceeding a threshold value. In response the inlet valve and outlet valves on the battery apparatus are opened. A flushing liquid is flushed or pumped through the battery apparatus where the flushing liquid enters the apparatus through the inlet valve and leaves the apparatus through the outlet valve. The flushing liquid is then stored in a reservoir.

21 Claims, 7 Drawing Sheets

(56) References Cited

U.S. PATENT DOCUMENTS

| | | | |
|---|---|---|---|
| 9,166,218 | B2 | 10/2015 | Karulkar |
| 9,461,336 | B2 | 10/2016 | Beckman |
| 10,873,101 | B2 | 12/2020 | Nariyama |
| 2004/0137291 | A1 | 7/2004 | Smedley |
| 2012/0251908 | A1 | 10/2012 | Bhandari |
| 2017/0233122 | A1 | 8/2017 | Thomas |
| 2018/0198112 | A1 | 7/2018 | Ogura |
| 2021/0242479 | A1 | 8/2021 | Song |

FOREIGN PATENT DOCUMENTS

| | | | | |
|---|---|---|---|---|
| CN | 119698713 | A | 3/2025 | |
| DE | 102006021585 | B3 | 9/2007 | |
| EP | 4578058 | A1 | 7/2025 | |
| JP | 2016528703 | A * | 9/2016 | ........ H01M 8/04223 |
| TW | I886473 | B | 6/2025 | |
| WO | 2004038829 | A2 | 5/2004 | |
| WO | WO-2005122310 | A1 * | 12/2005 | .............. B60L 50/72 |
| WO | WO-2015074006 | A1 * | 5/2015 | ............. C25D 17/02 |
| WO | WO-2021030723 | A1 * | 2/2021 | |
| WO | 2024/042377 | A1 | 2/2024 | |

OTHER PUBLICATIONS

Choi et al., Electrochemical Devices Comprising Compressed Gas Solvent Electrolytes, May 2015, See the Abstract. (Year: 2015).*

Arisaka et al., Storing Method and Storably Treated Body of High Polymer Electrolyte Fuel Cell Stack, Dec. 2005, See the Abstract. (Year: 2005).*

ブランシェ et al., Multi-stack electrochemical cell system and method of use, Sep. 2016. (Year: 2016).*

Intellectual Property Bureau of the Ministry of Economic Affairs Notice of Review Opinions, TW Application No. TW112115671, mailed Feb. 17, 2024, 5 pgs.

Notification of Transmittal of the International Search Report and the Written Opinion of the International Searching Authority, or the Declaration for International Application PCT/IB2023/055911, Mailed Feb. 12, 2024, 12 pgs.

* cited by examiner

THERMALLY ACTIVATED RETRACTABLE EMC PROTECTION

BACKGROUND

The present disclosure relates to device protection, and more specifically, to an electrolyte flushable battery apparatus for controlling and/or preventing thermal runaway.

Lithium-ion batteries have the potential to experience an internal short due to a latent manufacturing defect which can lead to a process of thermal runaway. During thermal runaway, battery temperatures can exceed more than 1000° F., at which point, the flammable electrolyte can ignite or even explode when exposed to oxygen in the air. It is believed that these types of thermal runaway events have caused many accidents including aviation and maritime accidents. One of the major causes of thermal runaway and ignition is due to chemical reactions of the electrolyte used within the battery.

SUMMARY

Embodiments of the present disclosure are directed to a thermal runaway protection system for a battery. The thermal runaway protection system includes a supply reservoir with a flushing liquid. The flushing liquid flows through the battery apparatus in response to a thermal runaway event. The system also includes at least one electrolyte flushable battery apparatus having a battery casing, an electrolyte liquid disposed within the battery casing, an inlet flushing valve on a first end of the battery casing that will open in response to a thermal runaway event, and an outlet flushing valve on a second end of the battery casing that will open in response to a thermal runaway event. The system further includes an outlet reservoir to receive the flushing liquid and the electrolyte fluid during flushing. An inlet manifold is connected to the inlet flushing valve and a pump when the pump is present. An outlet manifold is connected to the outlet flushing valve and the outlet reservoir.

Embodiments of the present disclosure are directed to a method for flushing the electrolyte out of an electrolyte flushable battery apparatus. The method monitors at least one condition of the electrolyte flushable battery apparatus to detect a potential thermal runaway event based on the at least one condition exceeding a threshold value. In response the inlet valve and outlet valves on the battery apparatus are opened. A flushing liquid is flushed through the battery apparatus where the flushing liquid enters the apparatus through the inlet valve and leaves the apparatus through the outlet valve.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
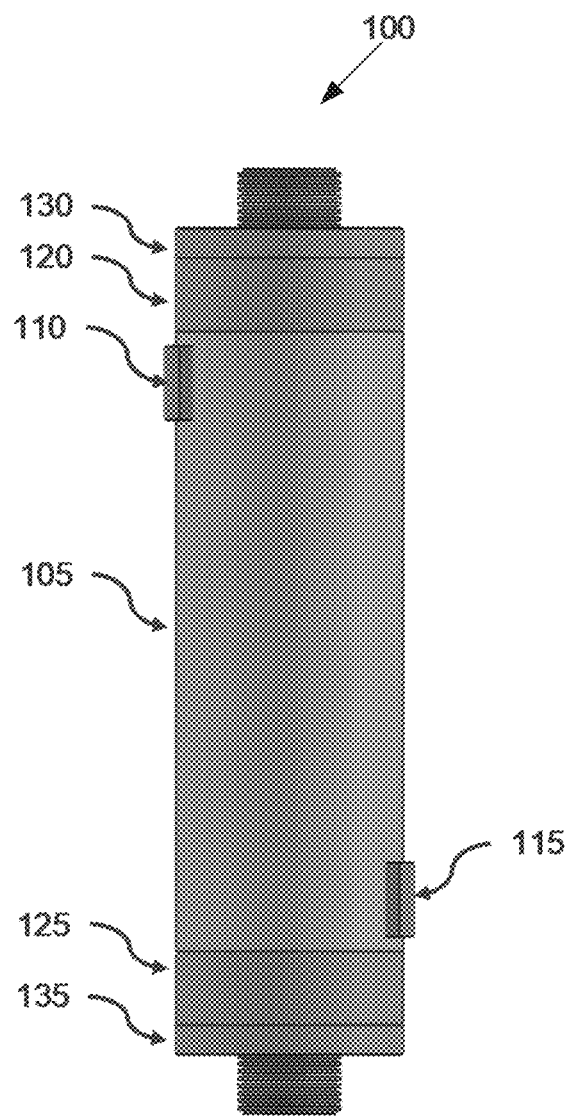
FIG. 1 is a diagrammatic illustration of an electrolyte flushable battery apparatus according to embodiments of the present disclosure.

While the disclosure is amenable to various modifications and alternative forms, specifics thereof have been shown by way of example in the drawings and will be described in detail. It should be understood, however, that the intention is not to limit the disclosure to the particular embodiments described. On the contrary, the intention is to cover all modifications, equivalents, and alternatives falling within the spirit and scope of the disclosure.

DETAILED DESCRIPTION

Aspects of the present disclosure relate to device protection, more particular aspects relate to an electrolyte flushable battery apparatus for controlling and/or preventing thermal runaway. While the present disclosure is not necessarily limited to such applications, various aspects of the disclosure may be appreciated through a discussion of various examples using this context.

Lithium-ion batteries have the potential to experience an internal short due to a latent manufacturing defect which can lead to a process of thermal runaway. During thermal runaway, battery temperatures can exceed more than 1000° F., at which point, the flammable electrolyte can ignite or even explode when exposed to oxygen in the air. It is believed that these types of thermal runaway events have caused many accidents including aviation and maritime accidents. One of the major causes of thermal runaway and ignition is due to chemical reactions of the electrolyte used within the battery.

Current solutions to handling thermal runaway are focused on keeping the battery at safe operating temperatures. For example, cooling liquids can be used to cool the batteries. Fans can be used as well to provide cooler air around the battery. Additionally thermal conducting film can be used to cool down the battery or dissipate heat from hot areas of the battery. However, none of these solutions can prevent thermal runaway, minimize the impact of thermal runaway, or stop it once it has begun.

The present disclosure addresses an approach that reduces or eliminates the electrolyte chemical reactions that exacerbate thermal runaway. Specifically, the present disclosure provides an electrolyte flushable battery apparatus comprised of an anode, cathode, separator, casing, positive terminal, negative terminal, hermetically sealed inlet flushing valve, hermetically sealed outlet flushing valve, inlet fitting, and outlet fitting. A flushing system is provided that will push a non-conductive liquid through an input to the electrolyte flushable battery apparatus and capture the electrolyte and flushing liquid on the output side of the electrolyte flushable battery apparatus. A process is provided to monitor the electrolyte flushable battery apparatus, detect an issue that will lead to thermal runaway, and trigger the flushing system. The present disclosure provides advantages in servers that utilize rechargeable batteries as well as any product that utilizes rechargeable batteries and has space for a flushing system (e.g., servers, UPS battery backup systems, electric vehicles, large appliances, etc.)

FIG. 1 is a side view of an electrolyte flushable battery apparatus 100. Apparatus 100 includes battery 105, positive terminal 110, negative terminal 115, hermetically sealed inlet flushing valve 120, hermetically sealed outlet flushing valve 125, inlet fitting 130, and outlet fitting 135. Although FIG. 1 illustrates a cylindrical battery it should be recognized that other battery shapes and sizes can be used.

Battery 105 contains all the components of a standard battery with only the case being illustrated in FIG. 1. the inside of the battery case (again not illustrated in FIG. 1) lies the anode, cathode, separator, and liquid electrolyte. The cathode is connected to positive terminal 110 and the anode is connected to negative terminal 115. The terminals 110, 115 are placed on the sides of the battery 105 to allow space for the other components of electrolyte flushable battery apparatus 100. In some embodiments, terminals 110 and 115 can be on the top and bottom of the battery 105 and the other components can be located on the sides of the battery 105.

The terminals 110, 115 are offset from each other. In the example in FIG. 1 the terminals 110, 115 are located on opposite sides of electrolyte flushable battery apparatus 100. This arrangement makes it difficult to short the terminals together. That is, a short will not be created if the battery 105 lies down or rolls over a conductive surface such as a metal table or enclosure.

Hermetically sealed inlet flushing valve 120 and hermetically sealed outlet flushing valve 125 are located on opposite sides of electrolyte flushable battery apparatus 100. These valves are both opened in response to the battery 105 experiencing a thermal runaway event. In some embodiments, the valves 120, 125 are electronically controlled and opened when an increase in temperature and/or voltage is detected. In some embodiments, the valves 120, 125 are self-acting and will open when a reaching a temperature or pressure that is only experienced during thermal runaway, such as 100 C. However, they can be configured to activate at other temperatures.

Inlet fitting 130 and outlet fitting 135 allow the electrolyte flushable battery apparatus 100 to connected to pipes and/or hoses as part of a larger flushing system designed into the system.

Figure 2A:
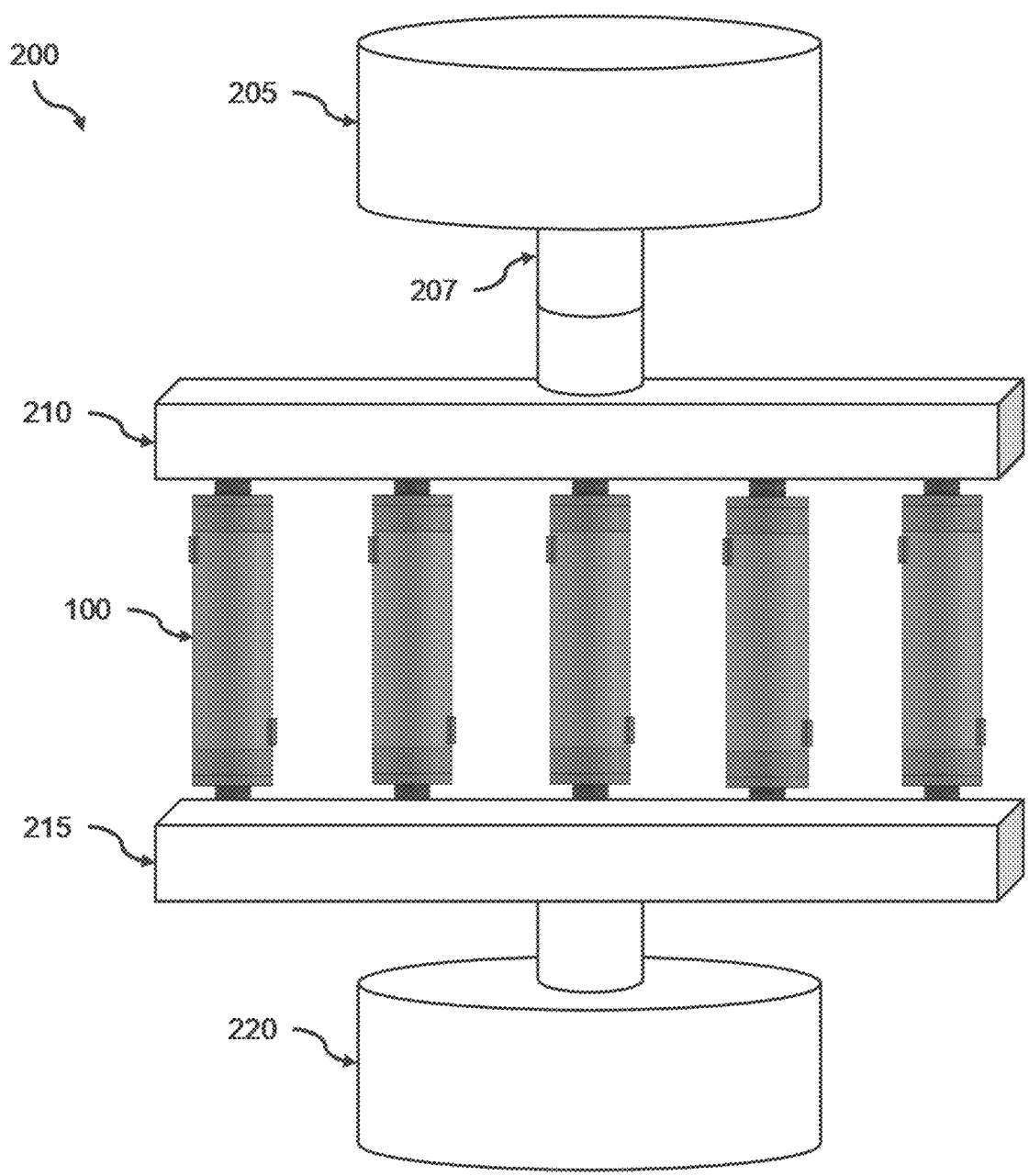
FIG. 2A is a diagrammatic illustration of a flushing system that contains a plurality of electrolyte flushable battery apparatuses according to embodiments of the present disclosure.

FIG. 2A is a diagrammatic illustration of a flushing system 200 that contains a plurality of electrolyte flushable battery apparatuses 100 according to embodiments of the present disclosure. The exact layout of these components and the number of electrolyte flushable battery apparatuses 100 is dependent upon the product in which the system is being implemented in. Flushing system 200 is comprised of a plurality of electrolyte flushable battery apparatuses 100-1. 100-2. 100-3, 100-4, 100-N (collectively 100), supply reservoir 205, pump 207, inlet manifold 210, outlet manifold 215, and outlet reservoir 220.

The supply reservoir 205 holds a liquid that will be used to flush an electrolyte flushable battery apparatus 100 if thermal runaway is detected. This flushing liquid can be a non-conductive liquid such as mineral oil. In some embodiments, the supply reservoir 205 contains an electronically controlled valve which holds the liquid in the reservoir until needed to flush an electrolyte flushable battery apparatus 100. The size of the supply reservoir 205 in some embodiments should be large enough to mitigate the thermal runaway consequence for at least one electrolyte flushable battery apparatus 100. However, in some embodiments the reservoir 205 is sized such that it can flush multiple battery apparatuses 100. In some embodiments, the supply reservoir 205 can be positioned in the center of the battery jelly roll (which consists of the anode, cathode, separator, and/or electrolyte) with a syringe pump that pushes through the center of the jelly roll to force the flushing liquid out. The flushing liquid will then come out at the top of the cell (internal to the casing) and be forced through the jelly roll which flushes the electrolyte out of the battery apparatus 100.

Pump 207 is used to supply pressure to the flushing liquid such that enough force is generated to flush electrolyte flushable battery apparatus 100. Any pump can be utilized for applying pressure to the flushing liquid. This can include, for example, an external gear pump, internal gear pump, gerotor pump, peristaltic pump, lobe pump, or vane pump. However, other pump types can be used. It should be noted that the battery is in a heated state during thermal runaway which reduces the viscosity of the electrolyte. This makes it easier to flush the battery. Thus, due to the temperature increase within electrolyte flushable battery apparatuses 100 caused by the beginning of a thermal runaway event prior to flushing, this reduced viscosity of the electrolyte allows for the use of a smaller pump to perform the flushing. In some embodiments, pipes and/or hoses can be connected between the supply reservoir 205 and the pump 207. It should be noted that some electrolyte may remain in the apparatus following the flush. However, since most of the electrolyte was flushed, any chance for a thermal runaway event can be eliminated or at least, significantly reduced. In some embodiments, a salt packet can be included within the casing that is released (e.g., by breaking down the packet material) when reaching a threshold temperature during thermal runaway. The salt is selected in order to help reduce the viscosity of the electrolyte before flushing. In some embodiments the pump 207 is not present. In these embodiments gravitational, rotational, or centripetal forces can supply enough force for the flushing liquid to pass through the battery 105 and flush the electrolyte.

Figure 2B:
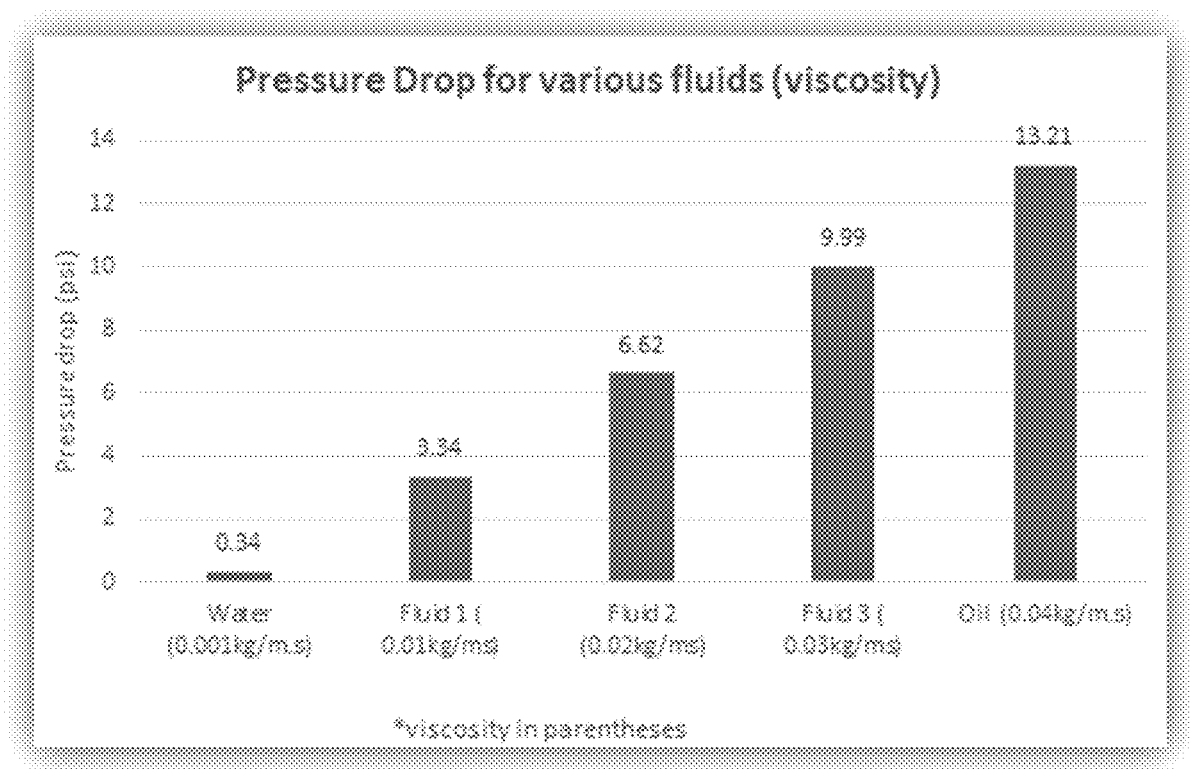
FIG. 2B is a graph illustrating a minimum amount of pressure required according to embodiments.

FIG. 2B is a graph illustrating the minimum amount of pressure that would be required to flush electrolytes of different viscosities in ~2 seconds, according to some embodiments of the present disclosure. In some embodiments, the pressure can be reduced from what is shown if a slower flush is desired. Conversely, the pressure can be increased if a faster flush is desired.

Referring back to FIG. 2A, during operation when a thermal runaway event has been detected, the pump 207 forces the flushing liquid into inlet manifold 210 which distributes the liquid to the electrolyte flushable battery apparatus 100 that is experiencing thermal runaway. The flushing liquid will only flow into the electrolyte flushable battery apparatus 100 in which hermetically sealed inlet flushing valve 120 and hermetically sealed outlet flushing valve 125 have been opened. In some embodiments, inlet manifold 210 can include valves or other pathways to direct the flushing liquid to the correct electrolyte flushable battery apparatus 100 such that flushing liquid is not wasted in filling up the entire manifold.

The inlet manifold 210 connects to electrolyte flushable battery apparatuses 100 using an inlet fitting 130. In some embodiments, pipes and/or hoses can be connected between the inlet manifold 210 and the electrolyte flushable battery apparatuses 100.

The outlet manifold 215 captures and directs the flushing liquid that has flowed through the electrolyte flushable battery apparatus 100 experiencing thermal runaway along with any electrolyte that was flushed out of the electrolyte flushable battery apparatus 100 to the outlet reservoir 220.

Figure 3:
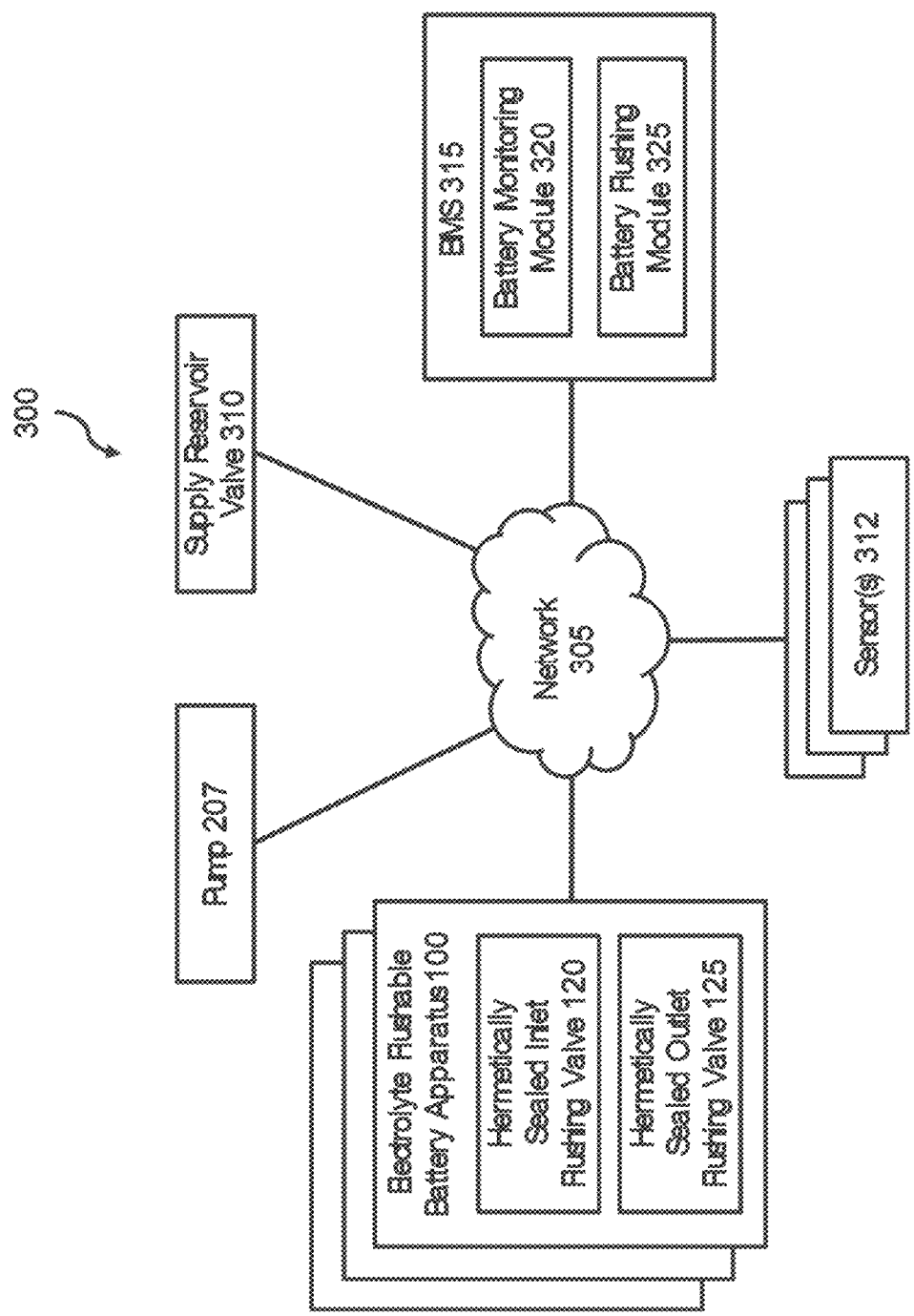
FIG. 3 is a system diagram illustrating a system using the electrolyte flushable battery apparatus according to embodiments of the present disclosure.

FIG. 3 illustrates a system 300 that monitors the one or more electrolyte flushable battery apparatuses 100 and flushes the electrolyte when a thermal runaway event is detected System 300 is comprised of one or more electrolyte flushable battery apparatuses 100, pump 207, supply reservoir valve 310, one or more sensors 312, and battery management system (BMS) 315 all interconnected via wired and/or wireless network 305. The wired and/or wireless network 305 can implement any communication protocol that allows data to be transferred between components of the system. For example, PCIe, I2C, Bluetooth, Wi-Fi, Cellular (e.g., 3G, 4G, 5G), Ethernet, fiber optics, etc.

As discussed above, the electrolyte flushable battery apparatus 100 contains hermetically sealed inlet flushing valve 120 and hermetically sealed outlet flushing valve 125 which are configured to receive input from the battery flushing module 325. The battery flushing module provides input to the flushing valves 120, 125 to instruct them when they should open. However, typically during shipping, storage, and normal operation, the valves are closed.

The supply reservoir valve 310, which is part of the supply reservoir 205, also receives input from the battery flushing module 325 for when to open. Again during shipping, storage, and normal operation, the valve 310 is closed. The pump 207 also receives input from battery flushing module 325 for when to turn on. Again, during shipping, storage, and normal operation, the pump 207 is tuned off.

The sensor(s) 312 are a component of the system 300 that are configured to monitor the temperature and/or voltage of each electrolyte flushable battery apparatus 100, and send output data to battery monitoring module 320 of BMS 315.

The BMS 315 includes a battery monitoring module 320, and a battery flushing module 325. The battery monitoring module 320 receives input from the one or more sensors 312 to determine if any of electrolyte flushable battery apparatuses 100 are experiencing early signs of a thermal runaway event. If one or more of the apparatuses 100 is experiencing a thermal runaway event, the battery monitoring module 320 is configured to activate the battery flushing module 325.

Figure 4:
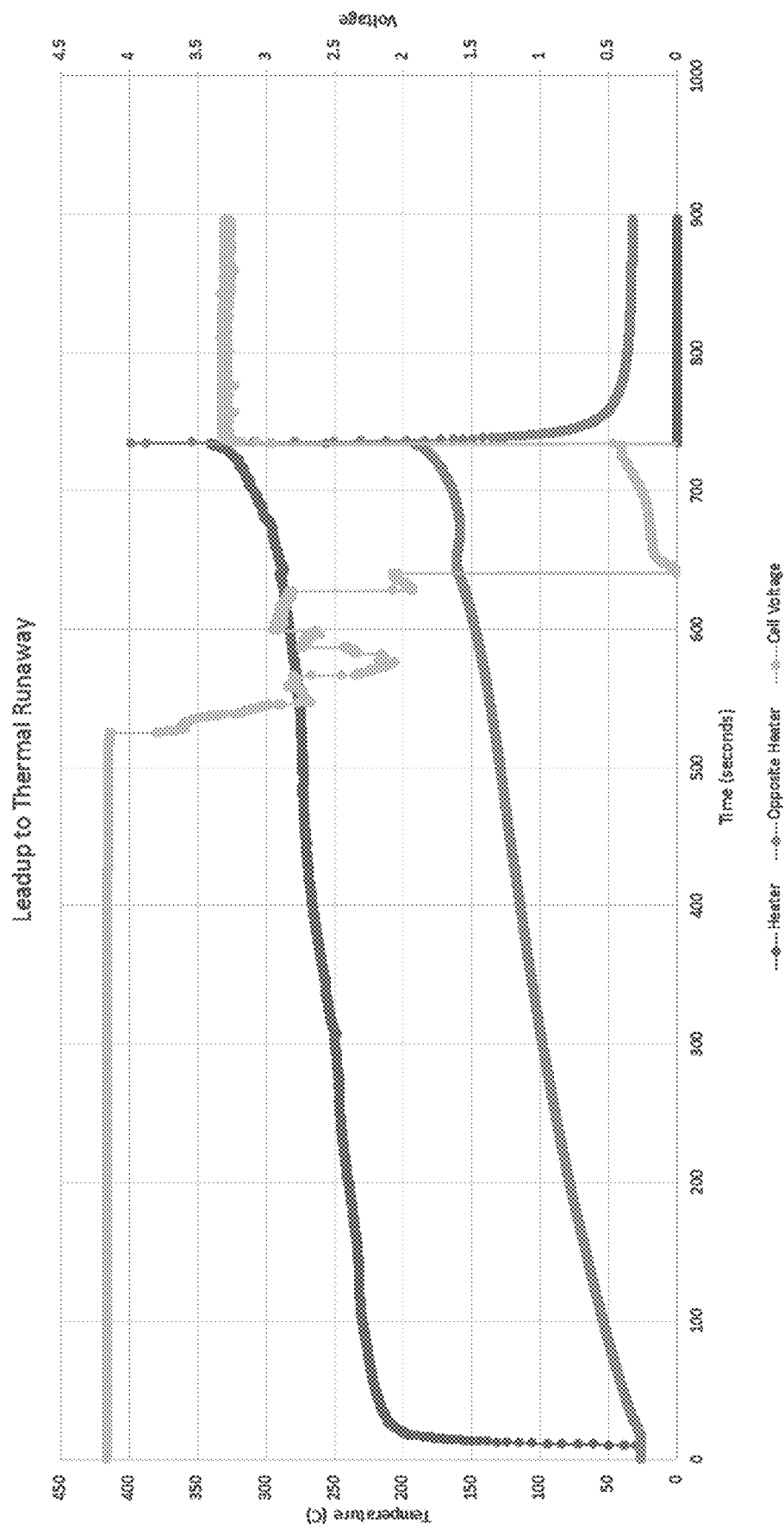
FIG. 4 is a graph illustrating examples of lab testing of batteries during thermal runaway according to embodiments.

FIG. 4 illustrates an example of the results of lab testing. FIG. 4 illustrates that both a temperature increase and a voltage drop can be detected in a single lithium-ion battery during the lead-up to thermal runaway. The results illustrate that the specific lithium-ion battery tested took ~1525 (>25 minutes) seconds to reach ignition. Even when a significant drop off in voltage occurs (~980 seconds), there is still 545 seconds (>9 minutes) until ignition. Due to the large amount of time from initial detection of a failure to the lithium-ion battery reaching ignition, there is time to perform the electrolyte flush.

In response to a detected thermal runaway event the battery flushing module 325 sends output signals to open valves 120, 125, and 310 and turns on pump 207 to flush the electrolyte flushable battery apparatus 100 that is experiencing thermal runaway. In some embodiments, additional valves within inlet manifold 210 (not illustrated in FIG. 2 or FIG. 3) can also be controlled to direct the flushing liquid to the correct electrolyte flushable battery apparatus 100. The duration of flushing can range from a few seconds to a couple of minutes depending on viscosity, inlet/outlet size, etc.

Figure 5:
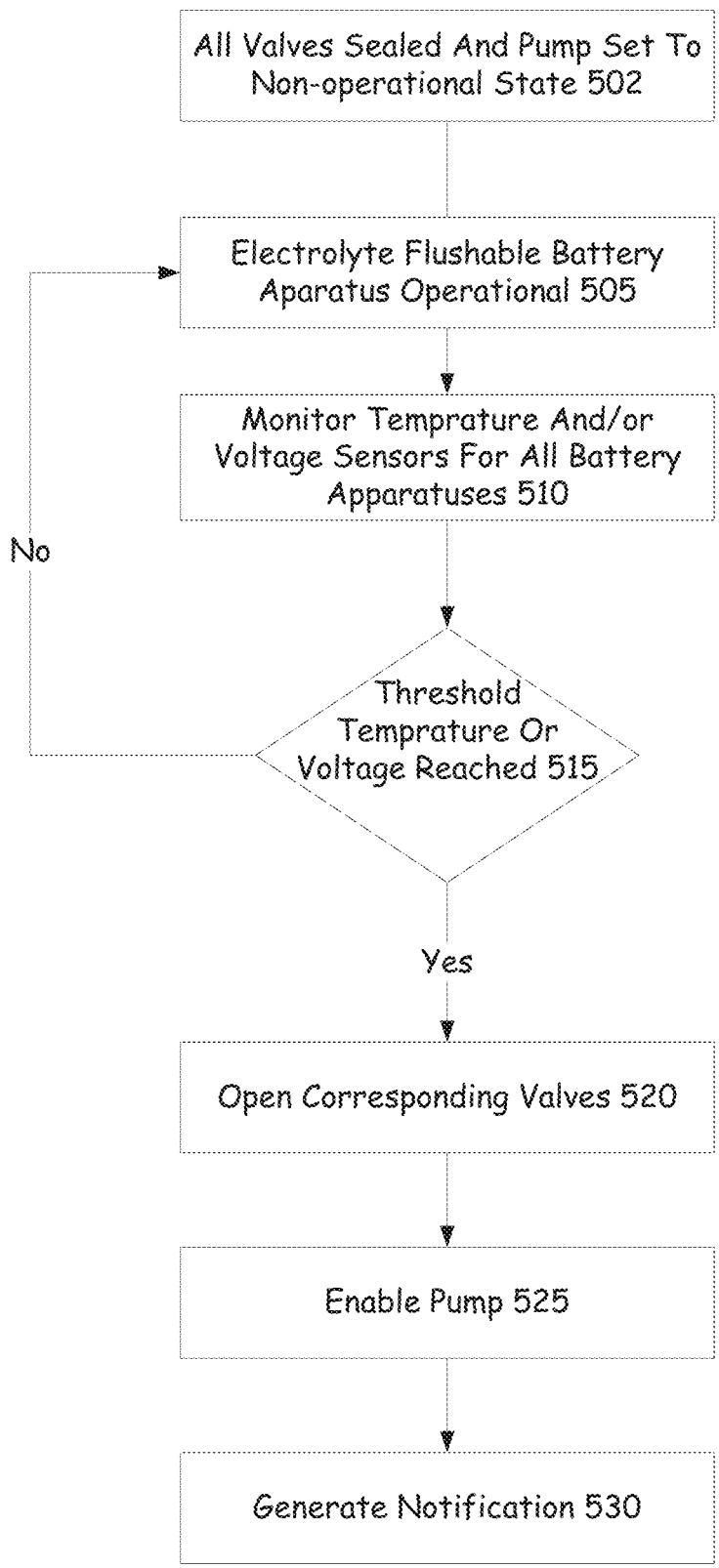
FIG. 5 is a flow diagram illustrating a process for detecting and responding to a thermal runaway event in a battery according to embodiments.

FIG. 5 is a flow diagram illustrating a process 500 for detecting and responding to a thermal runaway event in a battery. In some embodiments process 500 is executed by the BMS 315 which monitors electrolyte flushable battery apparatuses 100 and performs an electrolyte flushing action if required.

Process 500 begins at step 502 where all the valves (hermetically sealed inlet flushing valve 120 and hermetically sealed outlet flushing valve 125 on every electrolyte flushable battery apparatus 100, supply manifold valve, and any additional valves within inlet manifold 210) are sealed and pump 207 is set to its non-operational (i.e., off) state.

Next, at step 505, the electrolyte flushable battery apparatuses 100 begin/continue operation (either in a charged, charging, or discharge state) within a product. The process then continues to where the battery monitoring module 320 extracts the temperature and/or voltage from sensors 312 for all electrolyte flushable battery apparatuses 100. This is illustrated at step 510.

Next the system determines if a temperature and/or voltage threshold has been reached or exceeded. This is illustrated at step 515. In some embodiments, the voltage threshold is a threshold change in voltage within a threshold time that is greater than the typical discharge rate (e.g., $\Delta V{>}{=}0.25V$ within a timespan of 10 seconds). In some embodiments, additional sensors may be used to detect vented gases from electrolyte flushable battery apparatus 100.

If a temperature or voltage threshold has not been reached process 500 returns back to step 505 and continues operation and monitoring of the battery apparatuses 100. If a temperature or voltage threshold has been reached the process proceeds to step 520. At this step the process opens the hermetically sealed inlet flushing valve 120 and hermetically sealed outlet flushing valve 125 on the specific electrolyte flushable battery apparatuses 100 where the thermal runaway was detected. The supply manifold valve 310, and any additional valves within inlet manifold 210 are also opened at this step.

The pump 207 is activated to force the flushing liquid through the electrolyte flushable battery apparatuses 100 to flush the electrolyte into outlet reservoir 220. This is illustrated at step 525. However, in some embodiments, the flushing liquid is flushed through without the use of a pump, such as through the use of gravitational, rotational, or centripetal forces. A notification is generated to alert a user that the battery has been flushed. This is illustrated at step 530. This notification can take any form that would alert a user. For example, the notification could be a call home action, LED indicator, audible alarm, email, text message, etc. In some embodiments, following activation of the system the user may desire to replace electrolyte flushable battery apparatuses 100, refill supply reservoir 205, and/or empty outlet reservoir 220. The monitoring of the system can be paused during this particular type of operation.

Figure 6:
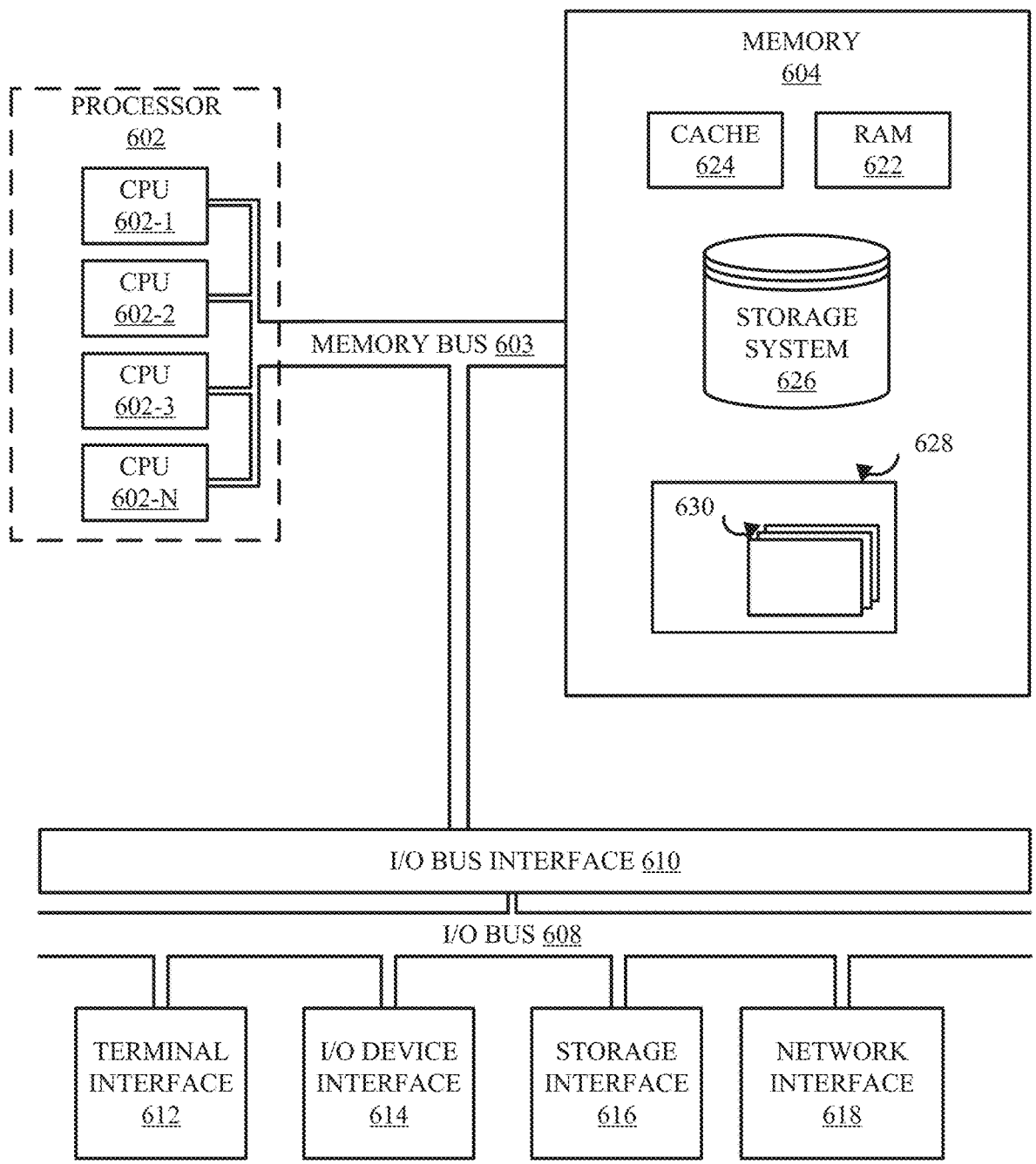
FIG. 6 is a block diagram illustrating a computing system according to one embodiment.

Referring now to FIG. 6, shown is a high-level block diagram of an example computer system 601 that may be used in implementing one or more of the methods, tools, and modules, and any related functions, described herein (e.g., using one or more processor circuits or computer processors of the computer), in accordance with embodiments of the present disclosure. In some embodiments, the major components of the computer system 601 may comprise one or more CPUs 602, a memory subsystem 604, a terminal interface 612, a storage interface 616, an I/O (Input/Output) device interface 614, and a network interface 618, all of which may be communicatively coupled, directly or indirectly, for inter-component communication via a memory bus 603, an I/O bus 608, and an I/O bus interface unit 610.

The computer system 601 may contain one or more general-purpose programmable central processing units (CPUs) 602-1, 602-2, 6023, 602-N, herein collectively referred to as the CPU 602. In some embodiments, the computer system 601 may contain multiple processors typical of a relatively large system; however, in other embodiments the computer system 601 may alternatively be a single CPU system. Each CPU 602 may execute instructions stored in the memory subsystem 604 and may include one or more levels of on-board cache.

System memory 604 may include computer system readable media in the form of volatile memory, such as random access memory (RAM) 622 or cache memory 624. Computer system 601 may further include other removable/non-removable, volatile/non-volatile computer system storage media. By way of example only, storage system 626 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 604 can include flash memory, e.g., a flash memory stick drive or a flash drive. Memory devices can be connected to memory bus 603 by one or more data media interfaces. The memory 604 may include at least one program product having a set (e.g., at least one) of program modules that are configured to carry out the functions of various embodiments.

Although the memory bus 603 is shown in FIG. 6 as a single bus structure providing a direct communication path among the CPUs 602, the memory subsystem 604, and the I/O bus interface 610, the memory bus 603 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 610 and the I/O bus 608 are shown as single respective units, the computer system 601 may, in some embodiments, contain multiple I/O bus interface units 610, multiple I/O buses 608, or both. Further, while multiple I/O interface units are shown, which separate the I/O bus 608 from various communications paths running to the various I/O devices, in other embodiments some or all of the I/O devices may be connected directly to one or more system I/O buses.

In some embodiments, the computer system 601 may be a multi-user mainframe computer system, a single-user system, or a server computer or similar device that has little or no direct user interface, but receives requests from other computer systems (clients). Further, in some embodiments, the computer system 601 may be implemented as a desktop computer, portable computer, laptop or notebook computer, tablet computer, pocket computer, telephone, smart phone, network switches or routers, or any other appropriate type of electronic device.

It is noted that FIG. 6 is intended to depict the representative major components of an exemplary computer system 601. In some embodiments, however, individual components may have greater or lesser complexity than as represented in FIG. 6, components other than or in addition to those shown in FIG. 6 may be present, and the number, type, and configuration of such components may vary.

One or more programs/utilities 628, each having at least one set of program modules 630 may be stored in memory 604. The programs/utilities 628 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 628 and/or program modules 630 generally perform the functions or methodologies of various embodiments.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method for flushing an electrolyte out of an electrolyte flushable battery apparatus, the method comprising:
   monitoring at least one condition of the electrolyte flushable battery apparatus;
   detecting a potential thermal runaway event based on the at least one condition exceeding a threshold value;
   opening an inlet flushing valve and an outlet flushing valve on the electrolyte flushable battery apparatus;
   releasing a salt packet into the electrolyte within the electrolyte flushable battery apparatus; and
   flushing a liquid through the electrolyte flushable battery apparatus, wherein the liquid enters the electrolyte flushable battery apparatus through the inlet flushing valve and leaves the electrolyte flushable battery apparatus through the outlet flushing valve.

2. The method of claim 1, wherein detecting the potential thermal runaway event further comprises:
   detecting that a voltage threshold has been exceeded.

3. The method of claim 1, wherein detecting the potential thermal runaway event further comprises:
   detecting that a temperature threshold has been exceeded.

4. The method of claim 1, wherein detecting the potential thermal runaway event further comprises:
   detecting vented gases.

5. The method of claim 1, wherein the liquid is a non-conductive liquid.

6. The method of claim 1, further comprising:
   generating a notification that a flushing event has occurred.

7. The method of claim 1, further comprising:
   replacing the liquid in response to a flushing event.

8. An electrolyte flushable battery apparatus comprising:
   a battery casing;
   an electrolyte liquid disposed within the battery casing;
   a salt packet is disposed within the battery casing;
   an inlet flushing valve disposed on a first end of the battery casing; and
   an outlet flushing valve disposed on a second end of the battery casing.

9. The electrolyte flushable battery apparatus of claim 8, wherein the inlet flushing valve is hermetically sealed.

10. The electrolyte flushable battery apparatus of claim 8, wherein the outlet flushing valve is hermetically sealed.

11. The electrolyte flushable battery apparatus of claim 9, wherein the inlet flushing valve and outlet flushing valve are electrically controlled.

12. The electrolyte flushable battery apparatus of claim 9, wherein the inlet flushing valve and outlet flushing valve are self.

13. The electrolyte flushable battery apparatus of claim 9. wherein the inlet flushing valve and the outlet flushing valve are self-acting.

14. A thermal runaway protection system comprising:
a supply reservoir containing a liquid;
an electrolyte flushable battery apparatus comprising:
   a battery casing;
   an electrolyte liquid disposed within the battery casing;
   a salt packet is disposed within the battery casing configured to be released into the electrolyte liquid in response to a thermal runaway event;
   an inlet flushing valve disposed on a first end of the battery casing configured to open in response to the thermal runaway event; and
   an outlet flushing valve disposed on a second end of the battery casing configured to open in response to the thermal runaway event;
an outlet reservoir configured to receive the liquid and the electrolyte liquid during flushing;
an inlet manifold connected to the inlet flushing valve; and
an outlet manifold connected to the outlet flushing valve and the outlet reservoir,
wherein the liquid is configured to flow through the electrolyte flushable battery apparatus in response to the thermal runaway event in the electrolyte flushable battery apparatus.

15. The thermal runaway protection system of claim 14. wherein the-flushing liquid is a non-conductive liquid.

16. The thermal runaway protection system of claim 14, further comprising:
at least one sensor configured to monitor at least one condition of the electrolyte flushable battery apparatus indicative of the thermal runaway event.

17. The thermal runaway protection system of claim 16, wherein the at least one condition is temperature of the electrolyte flushable battery apparatus.

18. The thermal runaway protection system of claim 16, wherein the at least one condition is voltage of the electrolyte flushable battery apparatus.

19. The thermal runaway protection system of claim 16. where the at least one condition exceeds a threshold time.

20. The thermal runaway protection system of claim 16, further comprising:
a battery monitoring module configured to determine the electrolyte flushable battery apparatus is experiencing the thermal runaway event; and
a battery flushing module configured to receive a signal from the battery monitoring module of the electrolyte flushable battery apparatus is experiencing the thermal runaway event, and configured to release the liquid to flush the electrolyte liquid.

21. The thermal runaway protection system of claim 14, further comprising:
a pump configured to pump the liquid through the electrolyte flushable battery apparatus.

* * * * *